United States Patent
Sato et al.

(10) Patent No.: US 9,416,821 B2
(45) Date of Patent: Aug. 16, 2016

(54) CAGE FOR ROLLING BEARING AND ROLLING BEARING

(71) Applicant: NTN CORPORATION, Osaka (JP)

(72) Inventors: Yoji Sato, Mie (JP); Masami Tada, Mie (JP); Hidenobu Mikami, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 14/441,794

(22) PCT Filed: Nov. 7, 2013

(86) PCT No.: PCT/JP2013/080141
§ 371 (c)(1),
(2) Date: May 8, 2015

(87) PCT Pub. No.: WO2014/073615
PCT Pub. Date: May 15, 2014

(65) Prior Publication Data
US 2015/0292558 A1   Oct. 15, 2015

(30) Foreign Application Priority Data
Nov. 8, 2012   (JP) .................... 2012-246550

(51) Int. Cl.
*F16C 33/56* (2006.01)
*F16C 19/46* (2006.01)
(Continued)

(52) U.S. Cl.
CPC ................ *F16C 33/565* (2013.01); *C23C 2/08* (2013.01); *C25D 7/10* (2013.01); *F16C 19/463* (2013.01);
(Continued)

(58) Field of Classification Search
CPC ............ F16C 9/04; F16C 19/26; F16C 19/46; F16C 33/46; F16C 33/543; F16C 2204/12; F16C 2223/02; C23C 26/00

USPC ......... 384/527, 456–457, 560, 572–573, 625, 384/912–913; 29/898.067, 898.12–898.13; 123/197.7

See application file for complete search history.

(56) References Cited

U.S. PATENT DOCUMENTS 3,729,347 A * 4/1973 Brown et al. ............. C22C 9/04
384/528
4,223,963 A * 9/1980 Glodin .................... F16C 33/44
29/898.1

(Continued)

FOREIGN PATENT DOCUMENTS

CN   101223301 A   7/2008
CN   101668958 A   3/2010

(Continued)

OTHER PUBLICATIONS

International Search Report dated Dec. 24, 2013.
(Continued)

*Primary Examiner* — Marcus Charles
(74) *Attorney, Agent, or Firm* — Hedman & Costigan, P.C.; James V. Costigan; Kathleen A. Costigan

(57) ABSTRACT

A cage for a rolling bearing having a film, formed on a surface thereof, which wears little over a long period of time from an initial stage of sliding contact between the film and rolling elements as well as other members and does not peel off the surface of a base material of the cage or dissolve in lubricating oil containing a sulfur-based additive and a rolling bearing having the cage. A cage (2) retains needle rollers (3) which are rolling elements of a needle rolling bearing (1). Of an entire outer surface of the cage (2), a tin alloy film consisting of tin and a metal other than the tin is formed on at least a sliding-contact surface of the cage (2) to be subjected to sliding contact with the needle rollers (3) and a sliding-contact surface thereof to be subjected to sliding contact with other members.

9 Claims, 4 Drawing Sheets

(51) Int. Cl.
*F16C 33/46* (2006.01)
*C23C 2/08* (2006.01)
*C25D 7/10* (2006.01)
F16C 9/02 (2006.01)
F16C 9/04 (2006.01)
C23C 18/48 (2006.01)
C25D 3/60 (2006.01)
C25D 17/16 (2006.01)

(52) U.S. Cl.
CPC ............. *F16C 33/4629* (2013.01); *C23C 18/48* (2013.01); *C25D 3/60* (2013.01); *C25D 17/16* (2013.01); *F16C 9/02* (2013.01); *F16C 9/04* (2013.01); *F16C 2204/30* (2013.01); *F16C 2223/60* (2013.01); *F16C 2223/70* (2013.01)

(56) References Cited

U.S. PATENT DOCUMENTS

| | | | | |
|---|---|---|---|---|
| 4,745,817 A | * | 5/1988 | Tomita | F02B 75/16 123/197.3 |
| 4,881,830 A | * | 11/1989 | Shepard | F16C 33/516 384/523 |
| 5,271,679 A | * | 12/1993 | Yamazumi | F16C 33/3856 384/527 |
| 5,482,385 A | * | 1/1996 | Yokota | F16C 33/30 384/527 |
| 5,735,614 A | * | 4/1998 | Isogawa | F02B 61/045 384/476 |
| 7,988,366 B2 | * | 8/2011 | Hanano | C23C 2/26 384/527 |
| 2010/0092121 A1 | | 4/2010 | Hanano | |
| 2010/0129021 A1 | | 5/2010 | Egami | |
| 2011/0229066 A1 | * | 9/2011 | Muhamad | F16C 33/494 384/470 |
| 2013/0330572 A1 | | 12/2013 | Staschko | |

FOREIGN PATENT DOCUMENTS

| | | | | |
|---|---|---|---|---|
| DE | 112006001905 T5 | | 1/2007 | |
| DE | 102010040469 B3 | | 1/2012 | |
| EP | 2146106 A1 | | 1/2010 | |
| GB | 580039 A | * | 8/1946 | ............. F16C 33/44 |
| JP | 06-313434 A | | 11/1994 | |
| JP | 2002-195266 A | | 7/2002 | |
| JP | 2005-147306 A | | 6/2005 | |
| JP | 2007-024295 A | | 2/2007 | |
| JP | 2007024295 A | * | 2/2007 | ............. C23C 22/48 |
| JP | 2008-291994 A | | 12/2008 | |
| JP | 2010-002034 A | | 1/2010 | |
| JP | 2012-097872 A | | 5/2012 | |
| KR | 1020080036203 A | | 4/2008 | |
| KR | 1020100017146 A | | 2/2010 | |
| WO | 2007/010982 A1 | | 1/2007 | |
| WO | 2008/133194 A1 | | 11/2008 | |

OTHER PUBLICATIONS

English Abstract for DE102010040469 dated Jan. 12, 2012.
Supplementary European Search Report in corresponding application, dated Mar. 9, 2016.

* cited by examiner

PRIOR ART

CAGE FOR ROLLING BEARING AND ROLLING BEARING

CROSS REFERENCE TO RELATED APPLICATIONS

This application is a national stage application of PCT/JP2013/080141, filed Nov. 7, 2013 under Section 371 which claims the priority of Japanese Patent Application Serial No. 2012-246550, filed Nov. 8, 2012.

TECHNICAL FIELD

The present invention relates to a cage for a rolling bearing and the rolling bearing having the cage and more particularly to a cage for the rolling bearing having a predetermined tin alloy film formed on a surface thereof.

BACKGROUND ART

A roller bearing supporting a rotational shaft is composed of a plurality of rollers (rolling elements) and a cage retaining a plurality of the rollers. FIG. 4 is a vertical sectional view of an engine using a roller bearing at small and big end portions of a connecting rod. As shown in FIG. 4, the engine has a crankshaft 21 outputting a rotational motion, a piston 22 making a linear reciprocating motion by combustion of a mixture gas, and a connecting rod 24 connecting the crankshaft 21 and the piston 22 to each other to convert the linear reciprocating motion to the rotational motion. The crankshaft 21 rotates on a rotation central axis with the crankshaft 21 taking a rotation balance by a balance weight. The connecting rod 24 has a big-end portion at a lower portion of a straight rod and a small-end portion at an upper portion thereof. The crankshaft 21 and a piston pin 23 coupling the piston 22 and the connecting rod 24 to each other are rotatably supported at the big-end portion of the connecting rod 24 and at the small-end portion thereof respectively via roller bearings 25, 26 mounted on engaging holes respectively.

As the roller bearings 25, 26, a needle roller bearing capable of receiving a high load, although a projected area thereof is small and having a high rigidity is used. The needle roller bearing includes a plurality of needle rollers and a cage retaining a plurality of the needle rollers. The cage has pockets for retaining the needle rollers respectively. A columnar portion positioned between the adjacent pockets retains the interval between the adjacent needle rollers. To decrease a load applied to the needle roller bearings mounted on the connecting rod at the small-end and big-end portions thereof owing to rotations of the needle rollers and rotations thereof on the center of the cage, the needle roller bearings are used in the outside diameter piloting to positively bring the outside-diameter surface of the cage into contact with the inside-diameter surfaces of the engaging holes formed at the small-end and big-end portions of the connecting rod.

On the other hand, in ordinary rolling bearings, the inside thereof is sealed with an inner ring, an outer ring, and a sealing material. The inside of the bearing is provided with rolling elements and a cage. Grease is filled inside the bearing to always lubricate the rolling elements and the cage therewith. On the other hand, because the needle roller bearing is provided with none of the inner ring, the outer ring, and the sealing member, the inside of the bearing is not sealed. Consequently the grease cannot be filled inside the bearing. Therefore when the needle roller bearing rotates, it is necessary to always supply lubricating oil to a sliding-contact portion thereof by a pump and the like.

Because the pump and the like start to operate simultaneously with the start of the rotation of the needle roller bearing, the lubricating oil does not spread to the entire needle roller bearing and thus sufficient lubrication is not accomplished immediately after the needle roller bearing starts to rotate. Therefore friction is generated to a high extent between the cage and the needle roller. Thereby the surface of the cage and that of the needle roller wear, and so do the outside-diameter surface of the cage and the inner-diameter surface of the housing of an actual machine. In the worst case, there is a fear that both are subjected to sear. Therefore to prevent wear and sear which occur immediately after the needle roller bearing starts to rotate, arts of forming a film having a lubricating property on the surface of the cage in advance are proposed.

For example, there is known a method of forming the hard film of diamond-like carbon (hereinafter referred to as DLC) by using a sputtering method on the guide surface of the rolling element of the cage consisting of the steel material having the hard layer formed on the surface thereof by carburizing treatment and forming the film of the soft metal such as silver on the hard film of the DLC (see patent document 1).

The art of directly forming the film of the soft metal on the surface of the cage by a plating method is proposed. For example, the method of forming the silver-plated film having a thickness of 25 to 50 μm on the surface of low carbon steel is known (see patent document 2). The patent document 2 describes that because the silver-plated film decreases the friction between the cage and the needle roller and the friction between the outside-diameter surface of the cage and the housing, the occurrence of sear can be prevented although the bearing is not sufficiently lubricated immediately after the bearing starts to rotate.

There is known the rolling bearing in which the electroless nickel-plated layer is formed on the surface of the cage to impart corrosion resistance thereto (see patent document 3). There is also known the cage for the rolling bearing in which the film consisting of the tin material having the predetermined thickness is formed on the surface of the cage to decrease the rotation torque (see patent document 4).

PRIOR ART DOCUMENT

Patent Document

Patent document 1: Japanese Patent Application Laid-Open Publication No. 2005-147306
Patent document 2: Japanese Patent Application Laid-Open Publication No. 2002-195266
Patent document 3: Japanese Patent Application Laid-Open Publication No. 06-313434
Patent document 4: Japanese Patent Application Laid-Open Publication No. 2012-97872

SUMMARY OF THE INVENTION

Problem to be Solved by the Invention

But in the method described in the patent document 1, after the soft metal disappears owing to wear, the hard film is exposed. As a result, the inside-diameter portion of the housing and the hard film are subjected to sliding contact. In this case, although the cage does not wear, there is a fear that the inside-diameter portion of the housing is worn owing to the sliding contact with the hard film formed on the surface of the cage. From the standpoint of the production, because the cage is subjected to the carburizing treatment, the DLC film is formed by a sputtering apparatus, and the soft metal film is formed on the DLC film, the operation steps are complicated and many steps are required. Further the sputtering apparatus is expensive and has an inefficient productivity. Thus the method described in the patent document 1 has a problem that the treatment to be performed by using the sputtering apparatus costs high.

In the method described in the patent document 2, in the lubricating system containing the sulfur-based additive, the silver-plated film formed on the surface of the cage binds with the sulfur component contained in the lubricating oil to form silver sulfide. The silver sulfide coats the surface of the silver-plated film. Because the silver sulfide is more frail than silver, the film peels off the surface of the cage or is inferior in its oil resistance. Thus the film is dissolved in the lubricating oil. Consequently the method described in the patent document 2 has a problem that the friction between the outside-diameter surface of the cage from which the silver-plated film disappears and the inside-diameter surface of the housing increases and thus sear is easy to occur. Similarly, in the case of a copper-plated film, copper sulfide is formed, which also poses a problem that owing to the peeling and dissolution of the film, the lubricating property of the cage deteriorates.

The method described in the patent document 3 is capable of preventing sulfur component-caused dissolution and peeling of the film. But the surface energy of the nickel-plated film formed on the surface of the cage is high. Thus the method has a problem that owing to the wear of the nickel-plated film at an initial stage of the sliding contact between the nickel-plated film and a mating material, the nickel-plated film is liable to adhere to the mating material and the state of the friction therebetween deteriorates and the friction therebetween increases. Consequently sear is liable to occur.

In the method described in the patent document 4, there is a fear that as a result of a long-time operation of the cage coated with the tin film, the film is subjected to interlayer delamination and drops from the surface of the base material of the cage. In addition, full examination is not made for the alloy film containing the tin. Thus there is a case in which a desired result cannot be obtained in dependence on the composition of the alloy, the metal material of the member which mates with the cage, and the thickness of the film.

The present invention has been made to cope with the above-described problems. It is an object of the present invention to provide a cage for a rolling bearing having a film, formed on a surface thereof, which wears little over a long period of time from an initial stage of sliding contact between the film and rolling elements as well as other members and does not peel off the surface of a base material of the cage or dissolve in lubricating oil containing a sulfur-based additive and a rolling bearing having the cage.

Means for Solving the Problem

The cage of the present invention for a rolling bearing retains rolling elements of the rolling bearing. Of an entire outer surface of the cage, a tin alloy film consisting of tin and a metal other than the tin is formed on at least a sliding-contact surface of the cage to be subjected to sliding contact with the rolling elements and a sliding-contact surface thereof to be subjected to sliding contact with other members. The metal other than the tin has a lower surface free energy than iron. In the tin alloy film, as a weight ratio (wt %) between the tin and the metal other than the tin, (tin: metal other than tin)=(65:35) to (95:5). A thickness of the tin alloy film is set to more than 5 μm and less than 30 μm.

The metal other than the tin is at least one metal selected from among bismuth, gold, silver, zinc, indium, cobalt, nickel, and antimony. The metal other than the tin is the zinc.

A body of the cage consists of an iron-based metal material selected from among bearing steel, carburized steel, carbon steel for machine structural use, cold rolled steel, and hot rolled steel.

When three specimens in which the tin alloy film has been formed on an entire surface of a base material consisting of SCM415 having a dimension of 3 mm×3 mm×20 mm (surface area: 258 mm$^2$) are immersed in 2.2 g of poly-α-olefin oil containing 1 wt % of zinc dithiophosphate at 150° C. for 200 hours, an amount of components of the films which elute from the specimens into the poly-α-olefin oil is not more than 500 ppm (0.05 wt %) when the amount is measured by an X-ray fluorescence measuring instrument.

The rolling bearing of the present invention has a plurality of rolling elements and a cage retaining the rolling elements. The above-described cage is the cage of the present invention for the rolling bearing. The rolling bearing supports a crankshaft outputting a rotational motion and is mounted on an engaging hole formed at an end portion of a connecting rod converting a linear reciprocating motion to the rotational motion.

Effect of the Invention

The cage of the present invention for the rolling bearing retains rolling elements of the rolling bearing. Of the outer surface of the cage, the tin alloy film consisting of tin and the metal other than the tin and having a predetermined thickness is formed on at least the sliding-contact surface of the cage to be subjected to sliding contact with the rolling elements and the sliding-contact surface thereof to be subjected to sliding contact with other members. The metal other than the tin has a lower surface free energy than iron. In the tin alloy film, as the weight ratio (wt %) between the tin and the metal other than the tin, (tin: metal other than tin)=(65:35) to (95:5). Therefore the tin alloy film restrains the sliding-contact surface of the cage from wearing and is excellent in oil resistance. Thereby the base material of the cage is not exposed for a long time and can be prevented from being subjected to sear.

Metals mating with the tin in forming the tin alloy are bismuth, gold, silver, zinc, indium, cobalt, nickel, and antimony each having a low surface free energy. Therefore the alloy film has a small amount of wear over a long period of time from an initial stage of the sliding contact between the film and the rolling element as well as the other members. Particularly the alloy film consisting of tin and zinc has a small amount of wear. In addition, at high temperatures, the component of the tin-zinc alloy film does not elute in the lubricating oil containing the sulfur-based additive. Thereby the cage of the present invention has a long life.

The rolling bearing of the present invention has a plurality of rolling elements and the cage of the present invention retaining the rolling elements. Thus it is possible to allow the sliding-contact surface of the cage to have a high lubricity over a long period of time and prevent the sliding-contact surface thereof from being subjected to sear.

The rolling bearing of the present invention supports the crankshaft outputting the rotational motion and is mounted on the engaging hole formed at one of the end portions of the connecting rod converting the linear reciprocating motion to the rotational motion. Therefore as compared with conventional rolling bearing in which a metal-plated film is formed on the surface of the base material of the cage, it is possible to prevent the outside diameter surface of the cage and the inside diameter surface of the engaging hole from wearing over a longer period of time from the initial stage of the sliding contact between the film and the rolling element as well as the other members. Thereby it is possible to lengthen the life of an entire apparatus.

MODE FOR CARRYING OUT THE INVENTION

The cage of the present invention for the rolling bearing retains rolling elements of the rolling bearing. The rolling bearing of the present invention retains a plurality of the rolling elements by using the cage.

Figure 1:
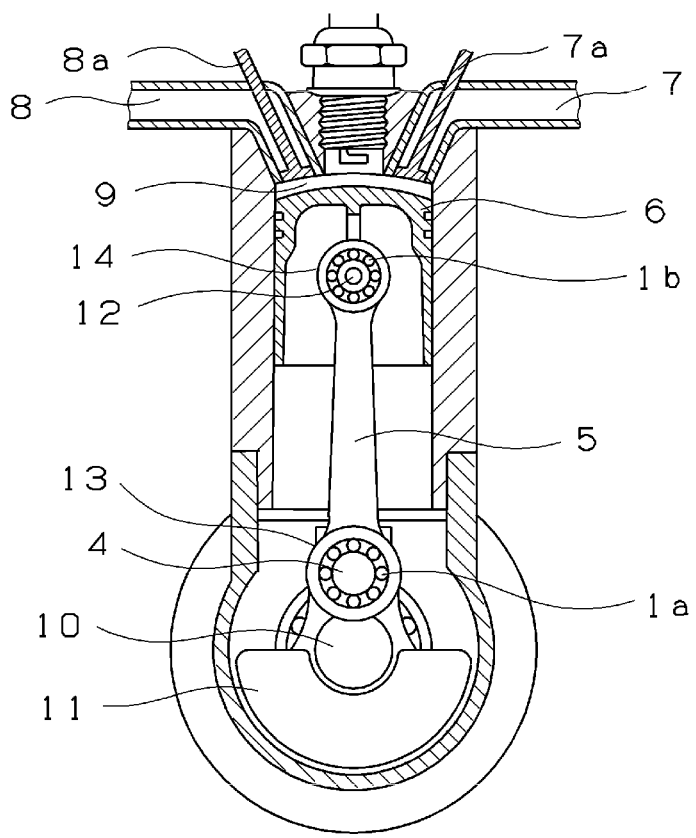
FIG. 1 is a vertical sectional view of a four-cycle engine using a needle roller bearing as one example a rolling bearing of the present invention.

The rolling bearing of the present invention is described below with reference to the drawings. FIG. 1 is a vertical sectional view of a four-cycle engine using a needle rolling bearing as one example of the rolling bearing of the present invention. The four-cycle engine has a suction stroke in which an inlet valve 7a is opened and an exhaust valve 8a is closed to feed an air-gasoline mixture to a combustion chamber 9 through an inlet pipe 7, a compression stroke in which the inlet valve 7a is closed and a piston 6 is pressed upward to compress the mixture gas, a combustion stroke in which the compressed mixture gas is exploded, an exhaust stroke an exploded combustion gas is exhausted through an exhaust pipe 8 by opening the exhaust valve 8a. The four-cycle engine has a piston 6 making a linear reciprocating motion by the combustion of the mixture gas, a crankshaft 4 outputting a rotational motion, and a connecting rod 5 connecting the piston 6 and the crankshaft 4 to each other to convert the linear reciprocating motion to the rotational motion. The crankshaft 4 rotates on a rotational shaft 10 with a balance weight 11 taking a balance in the rotation of the crankshaft.

The connecting rod 5 has a big-end portion 13 at a lower portion of a straight rod and a small-end portion 14 at an upper portion thereof. The crankshaft 4 is rotatably supported via a needle roller bearing 1a mounted on an engaging hole of the big-end portion 13. A piston pin 12 coupling the piston 6 and the connecting rod 5 to each other is rotatably supported via a needle roller bearing 1b mounted on an engaging hole of the small-end portion 14 of the connecting rod 5.

Figure 2:
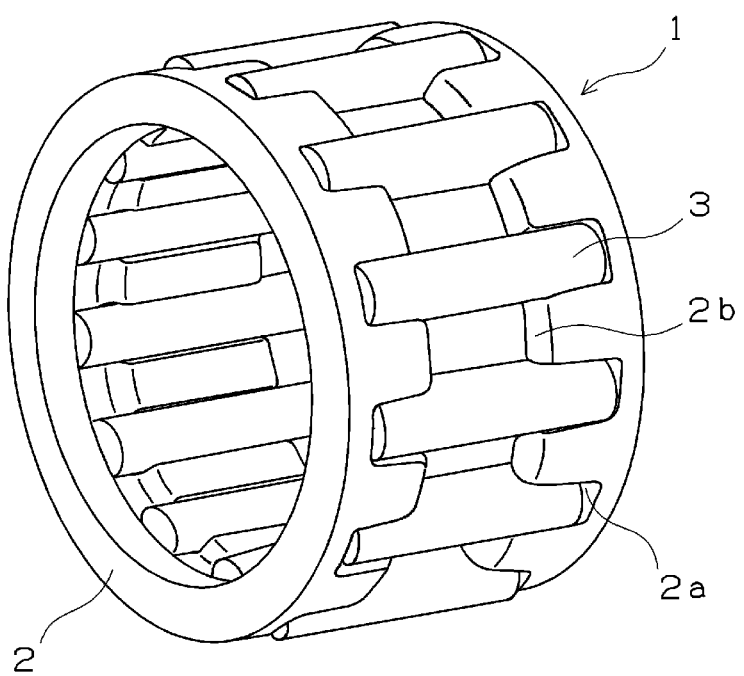
FIG. 2 is a perspective view showing the needle roller bearing using a cage of the present invention for the rolling bearing.

FIG. 2 is a perspective view showing the needle roller bearing using a cage of the present invention therefor. As shown in FIG. 2, a needle roller bearing 1 is constructed of a plurality of needle rollers 3 and a cage 2 retaining the needle rollers 3 at regular or irregular intervals. The cage 2 is the cage of the present invention for the rolling bearing. The needle roller bearing is not provided with an inner ring or an outer ring. The crankshaft 4 and the piston pin 12 are directly inserted into the inside-diameter side of the cage 2. The outside-diameter side of the cage 2 is fitted into the engaging hole, of the connecting rod 5, which serves as a housing (see FIG. 1). The needle roller bearing 1 has neither the inner ring nor the outer ring. Because the needle rollers 3 each having a much smaller diameter than the length thereof are used as the rolling elements of the needle roller bearing 1, the needle roller bearing 1 is smaller than ordinary rolling bearings having the inner and outer rings.

The cage 2 has pockets 2a for retaining the needle rollers 3 respectively. A columnar portion 2b disposed between the pockets retains the interval between the adjacent needle rollers 3. A tin alloy film which is described later is formed on portions of the surface of the cage 2. Of the entire outer surface of the cage, the tin alloy film is formed on at least a sliding-contact surface to be subjected to sliding contact with the rolling elements and a sliding-contact surface to be subjected to sliding contact with other members. The outer surface described herein is the outermost surface of the cage to be subjected to the sliding contact with the rolling elements and the other members. The outer surface also contacts lubricating oil. The other members are the inner and outer rings and the ends of the connecting rod.

To produce the cage easily, it is preferable to form the tin alloy film on the entire outer surface of the cage 2 including the surfaces of the pockets 2a which contact the needle rollers 3. The tin alloy film similar to that formed on the above-described portions of the surface of the cage 2 can be also formed on the surfaces of the needle rollers 3 which are the rolling elements and on the inside-diameter surfaces of the engaging holes of the connecting rod 5.

The tin alloy film of the present invention consists of tin and a metal other than the tin. The metal other than the tin has a lower surface free energy than iron. The surface free energy of iron is about 1700 mj/m$^2$ and that of the tin is about 500 mj/m$^2$. Examples of metals having a lower surface free energy than the iron include bismuth, gold, silver, zinc, indium, cobalt, nickel, and antimony.

The lower is the lower surface free energy, the smaller is an adsorption amount. Thus the alloy film having such properties can be expected to have a high wear restraining effect. Such being the case, the surface free energy of the alloy film is favorably not more than 1500 mj/m$^2$, more favorably not more than 1000 mj/m$^2$, and most favorably not more than 850 mj/m$^2$. To allow the film to securely have a high adhesion (adhesive force) to the base material thereof, the lower limit of the surface free energy of the alloy film is not less than 400 mj/$^2$m. Because the tin has a comparatively low surface free energy and serves as the matrix of the alloy film, it is possible to form the alloy film satisfying the above-described preferable range of the surface free energy by adopting metals having a lower surface free energy than the iron as metals other than the tin. As the metals other than the tin, it is preferable to use zinc (about 800 mj/m$^2$) of the above-described metals to form a tin-zinc alloy film. The tin-zinc alloy film has a small amount of wear. In addition, at high temperatures, the component of the tin-zinc alloy film does not elute in lubricating oil containing a sulfur-based additive.

Figure 3:
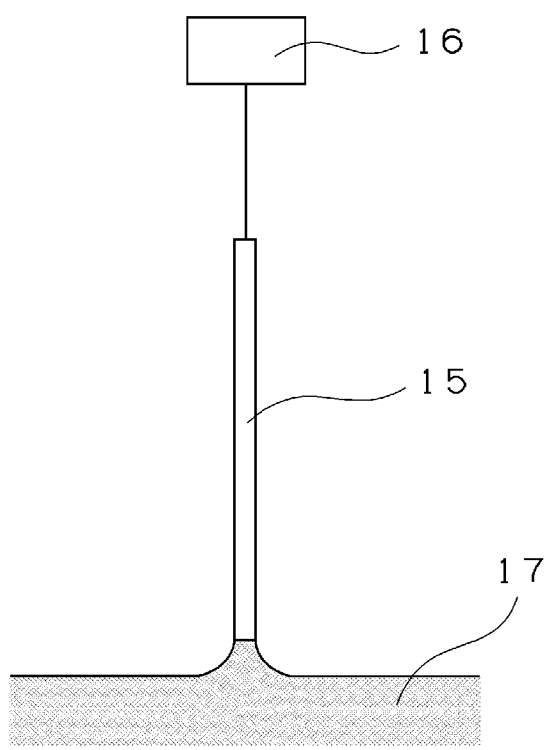
FIG. 3 shows one example of a method of measuring a surface free energy (surface tension).
Figure 4:
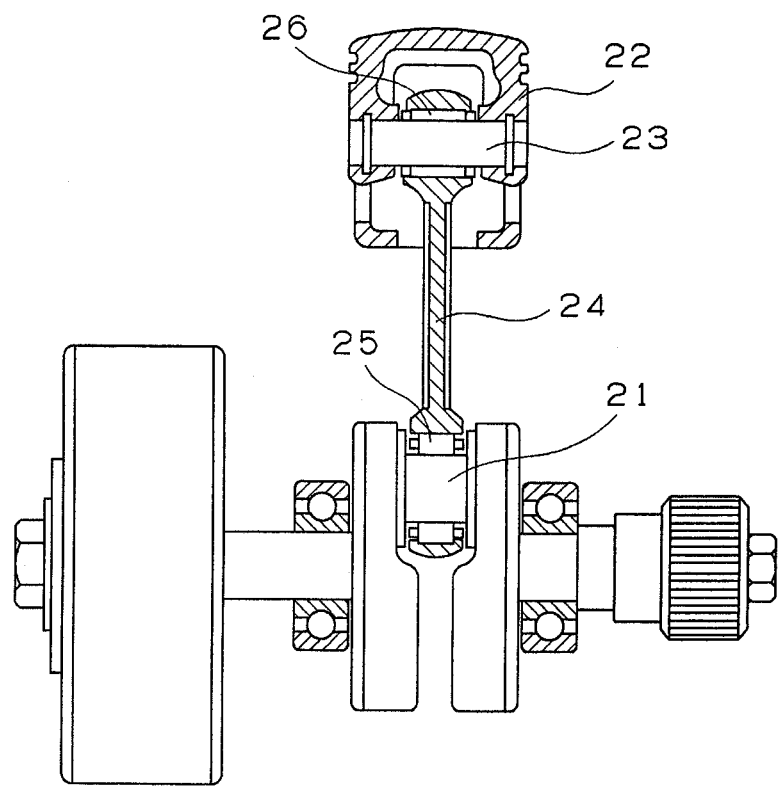
FIG. 4 is a vertical sectional view of an engine in which a roller bearing is used at small and big end portions of a connecting rod.

As a method of measuring the surface free energy, a Wilhelmy method using a device shown in FIG. 3 is exemplified. A thin plate 15 (mica plate or slide glass) is dipped in a molten metal 17 in a liquid state with the thin plate being hung on a balance 16. A liquid container is gradually moved upward (or the thin plate 15 is moved downward). When the thin plate 15 separates from the liquid, a force applied to the balance 16 is measured. Supposing that a tensile force applied to the thin plate (a force applied to the balance) is P, a buoyancy is B, the weight of the thin plate is M, the gravitational acceleration is g, the length of the circumference of the thin plate in a horizontal section thereof is L, and a surface tension is γ, an upward force (tensile force+buoyancy) applied to the thin plate and a downward force (gravitational force+surface tension) applied thereto balance each other. Thus the following equation (1) is established. The surface tension γ (surface free energy) is found from the following equation (2) obtained by deforming the equation (1). Supposing that an immersion depth of the thin plate is h, an area of the horizontal section is S, a density of the molten metal is p, the buoyancy B is found by Shpg. Other than the classification of metals, metals having a lower surface free energy than iron are selected by measuring the surface free energies thereof in the same condition by using the above-described method.

[Equation 1]

$$P+B=Mg+L\gamma \quad (1)$$

$$\gamma=(P+B-Mg)/L \quad (2)$$

In the tin alloy film, as the weight ratio (wt %) between the tin and the metal other than the tin, (tin: metal other than tin)=(65:35) to (95:5) and favorably (70:30) to (95:5). When the weight ratio of the metal other than the tin is less than 5 wt %, the amount of the tin is larger than that of the metal other than the tin. In this case, the property of the tin alloy film is close to that of a film consisting of the tin. Thereby there is a fear that interlayer delamination occurs in a long-time operation. When the weight ratio of the metal other than the tin exceeds 35 wt %, the entire alloy film is liable to have a high surface free energy. Thereby there is a fear that the wear amount of the entire alloy film increases at an initial stage of the sliding contact between the film and the rolling element as well as other members.

As the method of forming the tin alloy film on the surface of the cage, it is possible to adopt known film-forming methods such as physical evaporation (PVD) including electroplating, electroless plating, vacuum evaporation, ion plating, and sputtering; and chemical evaporation (CVD). It is preferable to form the alloy film by electroplating because the electroplating allows the alloy film to be formed at a low cost and easily. It is especially preferable to form the alloy film by barrel electroplating excellent in productivity.

Normally, owing to the sacrificial anticorrosion property of the zinc combined with the excellent corrosion-resistant property of the tin having a lower ionization tendency than iron, the tin-zinc alloy plated film is used as undercoating treatment to allow the base material of the cage to be corrosion-resistant. The present invention is characterized in that the tin-zinc alloy plated film is formed on the portions of the outermost surface of the cage to be subjected to the sliding contact with the rolling element and the other members. It is preferable to form the tin-zinc alloy plated film of the present invention directly on the surface of the base material of the cage without forming an undercoating film on the surface of the base material thereof.

As a method of forming the tin-zinc alloy plated film having a predetermined weight ratio by electroplating, it is possible to adopt known methods of treating the base material of the cage by immersing the base material thereof in a silicofluoride bath, a boric fluoride bath, a sulfonate bath, a phenol sulfonic acid bath, an alkanol sulfonic acid bath or an alkanesulfonic acid bath.

The thickness of the tin alloy film to be formed on the surface of the cage is set to more than 5 μm and less than 30 μm and favorably 10 to 25 μm. When the thickness of the tin alloy film is less than 5 μm, there is a fear that the tin alloy film wears owing to an initial wear and that the base material of the cage is exposed. When the thickness of the tin alloy film is not less than 30 μm, there is a fear that the tin alloy film peels off the surface of the base material of the cage while the rolling bearing is in operation, which may cause the lubrication state thereof to deteriorate. By setting the thickness of the tin alloy film to more than 5 μm and less than 30 μm, it is possible to prevent the base material of the cage from being exposed by the initial wear and the tin alloy film from peeling off the surface of the base material of the cage for a long period of time while the rolling bearing is in operation.

In the cage of the present invention for the rolling bearing, the cage body consists of an iron-based metal material. As the iron-based metal material, it is possible to use bearing steel, carburized steel, carbon steel for machine structural use, cold rolled steel or hot rolled steel for the cage body. Of these steels, it is preferable to use the carburized steel having a high heat resistance and a rigidity resistant to a high load. As the carburized steel, it is possible to use SCM415 and the like.

The tin alloy film of the present invention has sulfidation resistance. Thereby when the tin alloy film makes sliding contact with the rolling element and the other members in environment where the tin alloy film contacts the lubricating oil containing the sulfur-based additive, the alloy film is unlikely to peel off the surface of the base material of the cage or the components of the alloy film are unlikely to elute in the lubricating oil. Therefore it is possible to preferably use the cage of the present invention for the rolling bearing and the rolling bearing in the environment where they contact the lubricating oil containing the sulfur-based additive. The above-described environment includes a case in which the tin alloy film formed on the surface of the base material of the cage for the rolling bearing mounted on the connecting rod of the four-cycle engine contacts a mixture gas of gasoline and lubricating oil which is engine oil or contacts the engine oil, as described above and a case in which the tin alloy film contacts the lubricating oil supplied to the pockets of the cage for the rolling bearing.

The sulfur-based additive contains sulfur-based compounds such as zinc dialkyldithiophosphate (hereinafter referred to as ZnDTP). Examples of the sulfur-based additive include an antioxidant, a rust inhibitor, an extreme pressure agent, a detergent dispersant, a metal deactivator, and an anti-wear agent. Examples of the lubricating oil containing the sulfur-based additive include mineral oil, synthetic oil, ester oil, and ether oil.

"In the environment where the tin alloy film contacts the lubricating oil containing the sulfur-based additive, the alloy film is unlikely to peel off the surface of the base material of the cage or the components of the alloy film are unlikely to elute in the lubricating oil" means that for example, when three specimens in which the tin alloy film has been formed on the entire surface of a base material consisting of SCM415 having a dimension of 3 mm×3 mm×20 mm (surface area: 258 $mm^2$) are immersed in 2.2 g of poly-α-olefin containing 1 wt % of ZnDTP for 200 hours at 150° C., the amount of the components of the films which elute from the specimens into the poly-α-olefin oil is not more than 500 ppm (preferably not more than 200 ppm) when the amount is measured by using an X-ray fluorescence measuring instrument.

As the form of the rolling bearing of the present invention, both a radial bearing and a thrust bearing can be used. Although the configuration of the rolling element is not limited to a specific one, the effect of the present invention can be brought about to a high extent in the case where the rolling element is roller-shaped or needle roller-shaped. The roller-shaped configuration includes cylindrical roller-shaped, tapered roller-shaped, and spherical roller-shaped configurations.

By using the roller-shaped rolling element, as described above, the rolling bearing is mounted on the engaging hole formed at each of the small and big end portions of the connecting rod and is capable of supporting the piston pin and the crankshaft. Although the projected area of the rolling bearing is small, it is capable of receiving a high load. Particularly the rolling bearing using the "needle roller" having a high rigidity as its rolling element is capable of receiving a higher load than the rolling bearing using the "roller" as its rolling element.

The rolling bearing of the present invention is used for the connecting rod as described above and in addition can be preferably used for compressors and the like for use in air conditioners such as a car air conditioner and the like.

EXAMPLES

Examples 1 Through 3 and Comparative Examples 1 Through 8

To measure the wear amount of the film formed on the cage, a film shown in table 1 was formed on each specimen (cage) to conduct the following cage rotation test. Table 1 shows the results. The test condition, the specimen, and the measuring method are shown in detail below. The test condition was set on the assumption that the cage is used by mounting it on a connecting rod. The surface free energy of the material of each film shown in table 1 was measured by the above-described method.

<Cage Rotation Test>
Test Condition:
  Contact pressure: 5.3 MPa
  Sliding velocity: 800 m/minute
  Lubricating oil: mineral oil (10 W-30)
  Period of time: 100 hours
  Specimen: cage for needle bearing
  (made of SCM415: film was formed on entire surface of cage)

In the above-described test condition, with a concave mating material (made of SUJ2: quenched and tempered HRC62, roughness of concave portion: 0.1-0.2 μmRa) being pressed at a predetermined load against the cage mounted on a rotational shaft in a direction vertical to a rotational shaft, the cage was rotated together with the rotational shaft to evaluate the wear depth and friction property of each film formed on the surface of the cage. As the friction property (state of film), specimens in which the film remained on the surface of the cage after the test finished and which had a satisfactory lubricated state were recorded as "○". Specimens in which the film peeled off the surface of the cage, and the surface of the film was rough and had an unsatisfactory lubricated state were recorded as "Δ". Specimens in which the base material of the cage was exposed and subjected to sear were recorded as "x". The radius of the R portion of the concave mating material was set larger than the radius of the cage by 20 to 55 μm. As the amount of the lubricating oil used, half the height of each cage was immersed therein.

Specimens were prepared to subject them to the following test of immersing them in the lubricating oil. Table 1 shows the results. The test condition, the specimen, and the measuring method are shown in detail below.

<Test of Immersing Film in Lubricating Oil>

After three square bars each coated with a film was immersed in 2.2 g of lubricating oil [1 wt % of ZnDTP (LUBRIZOL677A produced by LUBRIZOL Corporation was added to poly-α-olefin: LucantHL-10 (produced by Mitsui Chemicals Inc.] having a temperature of 150° C. for 200 hours, the concentration (eluted amount, ppm) of a film component which eluted in the lubricating oil was measured. The concentration was determined by X-ray fluorescence measurement [X-ray fluorescence measuring instrument: Rigaku ZSX 100e (produced by Rigaku Corporation)]. As the specimen of each of the examples and the comparative examples, three square bars (total of surface areas: 774 mm$^2$) made of SCM415 having the dimension of 3 mm×3 mm×20 mm were used.

TABLE 1

|  | Example | | | Comparative example | |
| --- | --- | --- | --- | --- | --- |
|  | 1 | 2 | 3 | 1 | 2 |
| Composition of film (ratio of composition)※1 | Sn—Zn (95/5) | Sn—Zn (70/30) | Sn—Zn (95/5) | Ag※2 | Cu |
| Film-forming method | Electroplating | Electroplating | Electroplating | Electroplating | Electroplating |
| Film thickness, μm | 25 | 20 | 10 | 20 | 20 |
| Surface free energy, mj/m$^2$ | 460 | 550 | 460 | 920 | 1200 |
| Properties |  |  |  |  |  |
| State of film after rotation test finished | ○ | ○ | ○ | ○ | ○ |
| Wear depth(μm) | 4 | 7 | 5 | 4 | 10 |
| Elution amount in immersion test(ppm) | 0 | 0 | 0 | 600 | 3500 |

|  | Comparative example | | | | | |
| --- | --- | --- | --- | --- | --- | --- |
|  | 3 | 4 | 5 | 6 | 7 | 8 |
| Composition of film (ratio of composition)※1 | Sn | Sn | Ni | Ni-PTFE※3 (70/30) | Sn—Zn (95/5) | Sn—Zn (95/5) |
| Film-forming method | Electroplating | Electroplating | electroless plating | electroless plating | Electroplating | Electroplating |
| Film thickness, μm | 5 | 20 | 20 | 20 | 5 | 30 |
| Surface free energy, mj/m$^2$ | 450 | 450 | 1650 | — | 460 | 460 |
| Properties |  |  |  |  |  |  |
| State of film after rotation test finished | x | Δ | x | x | x | Δ |
| Wear depth(μm) | 5 | 6 | 20 | 20 | 5 | 6 |
| Elution amount in immersion test(ppm) | 0 | 0 | 0 | 0 | 0 | 0 |

※1Sn—Zn is shown by weight ratio (Sn/Zn). Ni-PTFE is shown by volume ratio (Ni/PTFE).
※2Copper was plated as undercoat. Entire film thickness: Ag 15 μm + Cu strike plating 5 μm = 20 μm
※3Ni was plated as undercoat. Entire film thickness: Ni 10 μm + Ni-PTFE 10 μm = 20 μm As apparent from the results shown in table 1, in the specimen of the comparative examples 1 and 2, both films consisted of metal plating conventionally used. The result was that metals eluted in the lubricating oil in the immersion test and that a large amount of copper eluted in the lubricating oil. In the specimens of the comparative examples 3 and 4, both films consisted of the plated tin. The result was that the films were inferior to the film consisting of the plated tin-zinc alloy in the wear state thereof after the rotation test finished. On the other hand, in the specimens of the examples 1 through 3, the films consisted of the plated tin-zinc alloy and had a thickness in a predetermined range. Thus the films were excellent in the wear state thereof after the rotation test finished. Further neither the film peeled off the base material nor the component of the film eluted in the lubricating oil.

INDUSTRIAL APPLICABILITY

In the rolling bearing of the present invention, the film formed on the surface of the base material of the cage wears little over a long period of time from an initial stage of sliding contact between the film and the rolling element as well as other members. Further the film does not peel off the surface of the base material of the cage or dissolve in the lubricating oil containing the sulfur-based additive. Therefore the rolling bearing of the present invention can be suitably utilized in the lubricating oil containing the sulfur-based additive and in a lean lubrication condition.

EXPLANATION OF REFERENCE SYMBOLS AND NUMERALS

1: needle roller bearing (rolling bearing)
2: cage
3: needle roller
4: crankshaft
5: connecting rod
6: piston
7: inlet valve
8: exhaust valve
9: combustion chamber
10: rotation central axis
11: balance weight
12: piston pin
13: big-end portion
14: small-end portion
15: thin plate
16: balance
17: molten metal
21: crankshaft
22: piston
23: piston pin
24: connecting rod
25: roller bearing
26: roller bearing

The invention claimed is:

1. A cage for a rolling bearing retaining rolling elements of said rolling bearing, wherein of an entire outermost surface of said cage, a tin alloy film consisting of tin and a metal other than said tin is formed on at least a sliding-contact surface of said cage to be subjected to sliding contact with said rolling elements and a sliding-contact surface thereof to be subjected to sliding contact with other members; said metal other than said tin has a lower surface free energy than iron; in said tin alloy film, as a weight ratio (wt %) between said tin and said metal other than said tin, (tin: metal other than tin)=(65:35) to (95:5); and a thickness of said tin alloy film is set to more than 5 μm and less than 30 μm.

2. A cage for a rolling bearing according to claim 1, wherein said metal other than said tin is at least one metal selected from among bismuth, gold, silver, zinc, indium, cobalt, nickel, and antimony.

3. A cage for a rolling bearing according to claim 2, wherein said metal other than said tin is said zinc.

4. A cage for a rolling bearing according to claim 1, wherein a body of said cage consists of an iron-based metal material selected from among bearing steel, carburized steel, carbon steel for machine structural use, cold rolled steel, and hot rolled steel.

5. A cage for a rolling bearing according to claim 1, wherein when three specimens in which said tin alloy film has been formed on an entire surface of a base material consisting of SCM415 having a dimension of 3 mm×times 3 mm×times 20 mm (surface area: 258 mm$^2$) are immersed in 2.2 g of poly-α-olefin oil containing 1 wt % of zinc dithiophosphate at 150° C. for 200 hours, an amount of components of said films which elute from said specimens into said poly-α-olefin oil is not more than 500 ppm (0.05 wt %) when said amount is measured by an X-ray fluorescence measuring instrument.

6. A rolling bearing comprising a plurality of rolling elements and a cage retaining said rolling elements, wherein said cage is a cage for a rolling bearing as claimed in claim 1.

7. A rolling bearing according to claim 6, which supports a crankshaft outputting a rotational motion and is mounted on an engaging hole formed at an end portion of a connecting rod converting a linear reciprocating motion to said rotational motion.

8. A cage for a rolling bearing according to claim 1, wherein said tin alloy film is formed directly on a surface of a base material of said cage without an undercoating film being formed on said surface of said base material thereof.

9. A cage for a rolling bearing according to claim 1, wherein in said tin alloy film, as a weight ratio (wt %) between said tin and said metal other than tin, (tin: metal other than tin)=(790:30) to (95:5).

* * * * *